United States Patent
Goodarzi et al.

(10) Patent No.: US 11,607,918 B2
(45) Date of Patent: Mar. 21, 2023

(54) TOW ASSIST SYSTEM

(71) Applicant: GM GLOBAL TECHNOLOGY OPERATIONS LLC, Detroit, MI (US)

(72) Inventors: Avesta Goodarzi, Whitby (CA); Ralph D. Schlottke, Whitby (CA); Grant L. Meade, Whitby (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 672 days.

(21) Appl. No.: 16/658,566

(22) Filed: Oct. 21, 2019

(65) Prior Publication Data
US 2021/0114422 A1 Apr. 22, 2021

(51) Int. Cl.
| | |
|---|---|
| *B60D 1/24* | (2006.01) |
| *B62D 53/08* | (2006.01) |
| *B60D 1/56* | (2006.01) |
| *B60D 1/06* | (2006.01) |
| *B60R 16/033* | (2006.01) |
| *B60D 1/62* | (2006.01) |

(52) U.S. Cl.
CPC ............... *B60D 1/24* (2013.01); *B60D 1/06* (2013.01); *B60D 1/248* (2013.01); *B60D 1/56* (2013.01); *B60D 1/62* (2013.01); *B60R 16/033* (2013.01); *B62D 53/08* (2013.01)

(58) Field of Classification Search
CPC . B60D 1/06; B60D 1/24; B60D 1/248; B60D 1/56; B60D 1/62; B60D 1/075; B60D 1/247; B60D 1/665; B60R 16/033; B62D 53/08; B62D 53/0005; B62D 53/0864; B60S 13/00
USPC .......................................... 701/70; 280/400
See application file for complete search history.

(56) References Cited

U.S. PATENT DOCUMENTS 3,360,064 A 12/1967 Budzich
2019/0233034 A1* 8/2019 Viele ...................... B62D 59/04

FOREIGN PATENT DOCUMENTS

JP 2010167815 A 5/2010

* cited by examiner

*Primary Examiner* — Kevin Hurley
*Assistant Examiner* — Felicia L. Brittman
(74) *Attorney, Agent, or Firm* — Lorenz & Kopf LLP (57) ABSTRACT

Systems are provided for assisting in towing a trailer by a lead vehicle. A wheeled tow assist unit couples between the lead vehicle and the trailer. A drive unit onboard the tow assist unit drives the wheels in response to a force between the trailer and the tow assist unit. The tow assist unit bears at least a portion of the force required to tow the trailer.

20 Claims, 6 Drawing Sheets

TOW ASSIST SYSTEM

The present disclosure generally relates to towing by vehicles and in particular, relates to a tow assist system that enables towing a trailer that exceeds the vehicle's towing capacity.

Towing is a common activity and generally involves attaching a trailer directly to a lead vehicle by a hitch. Hitches come in a wide variety of configurations such as receiver, fifth wheel, gooseneck and pintle hitches. Hitches also come in a variety of weight classes including classes 1-5, which roughly cover towing capacities between 2000 and 20,000 pounds (approximately 900-9100 kilograms). The type of hitch used is matched to the weight of the trailer to be towed and each vehicle has a towing capacity that limits the towing ability of the vehicle. Towing capacity is limited to the lowest-rated towing component, which since the hitch may be selected is often the vehicle.

Vehicles are typically purchased for a variety of uses and towing is often limited to an occasional use. For example, a vehicle may be used for daily commuting and may be used for towing on weekends or holidays. In other situations, a user may have multiple trailers of different weights requiring different towing capacity vehicles. Higher towing capacity vehicles tend to be more costly than lower towing capacity vehicles, and so investing in a vehicle based on only an occasional use may be undesirable. In addition, using a high towing capacity vehicle for non-towing activities generally leads to higher operating expenses.

Accordingly, it is desirable to provide systems that have the flexibility to tow higher weights with vehicles that have a towing capacity below the towed weight. Furthermore, other desirable features and characteristics of the present invention will become apparent from the subsequent detailed description and the appended claims, taken in conjunction with the accompanying drawings and the foregoing technical field and introduction.

SUMMARY

Systems are provided to deliver tow assist when towing a trailer by a lead vehicle. In a number of embodiments, a tow assist unit includes wheels and is configured to couple between the lead vehicle and the trailer. A drive unit is provided onboard the tow assist unit. In response to a towing force of the trailer, the drive unit drives at least one of the wheels to reduce a proportion of the towing force borne by the vehicle.

In additional embodiments, a sensor on the tow assist unit is configured to sense forces between the tow assist unit and the lead vehicle, and another sensor on the tow assist unit is configured to sense the force between the trailer and the tow assist unit.

In additional embodiments, a controller on the tow assist unit is configured to actuate the drive unit in response to inputs from the first sensor and the second sensor.

In additional embodiments, a coupling is disposed between the lead vehicle and the tow assist unit, through which a charging power supply is delivered.

In additional embodiments, the tow assist unit is configured to operate in a manual mode separate from the lead vehicle.

In additional embodiments, an inertial measurement unit and a controller are disposed on the tow assist unit. The controller is configured to actuate the drive unit in response to inputs from the inertial measurement unit to effect trajectory changes in the system for stability.

In additional embodiments, a fifth wheel coupling is disposed between the tow assist unit and the trailer and a bumper-pull type coupling is disposed between the lead vehicle and the tow assist unit.

In additional embodiments, the tow assist unit is configured to supply electrical power to the trailer.

In additional embodiments, the tow assist unit includes an axle on which the at least two wheels rotate and a recess in a rear end of the tow assist unit. A hitch is disposed in the recess and is configured to couple with the trailer, with a ball on the hitch that is substantially centered over the axle.

In additional embodiments, actuators are disposed on the tow assist unit. A tongue on the tow assist unit is configured to couple with the lead vehicle. A first sensor on the tongue is configured to sense forces between the lead vehicle and the tow assist unit. A hitch is disposed on the tow assist unit and is configured to couple with the trailer. A second sensor is disposed on the hitch and is configured to sense the force between the trailer and the tow assist unit. A controller is configured to actuate the drive unit and the actuators in response to inputs from the first and second sensors so that the lead vehicle bears only a portion of the force between the trailer and the tow assist unit.

In a number of additional embodiments, a tow assist system for towing a trailer by a lead vehicle includes a tow assist unit including four wheels arranged on two axles. The tow assist unit is configured to couple between the lead vehicle and the trailer. In response to a towing force between the trailer and the tow assist unit, a drive unit onboard the tow assist unit drives at least one of the wheels to bear at least a portion of the towing force by the tow assist unit. In response to the towing force, a brake on the tow assist unit operates to slow the trailer.

In additional embodiments, a sensor on the tow assist unit is configured to sense forces between the tow assist unit and the lead vehicle. Another sensor on the tow assist unit is configured to sense forces, including the towing force, between the trailer and the tow assist unit.

In additional embodiments, a controller on the tow assist unit is configured to actuate the drive unit and the brake in response to the sensors.

In additional embodiments, a charging power supply is delivered through a coupling between the lead vehicle and the tow assist unit.

In additional embodiments, the tow assist unit is configured to operate in a manual mode separate from the lead vehicle.

In additional embodiments, an inertial measurement unit and a controller are included on the tow assist unit. The controller is configured to actuate the drive unit and the brake in response to inputs from the inertial measurement unit to effect trajectory changes in the system for stability.

In additional embodiments, a fifth wheel coupling is disposed between the tow assist unit and the trailer. A bumper-pull type coupling is disposed between the lead vehicle and the tow assist unit.

In additional embodiments, a battery pack and an inverter are included on the tow assist unit. The tow assist unit is configured to supply power to the trailer from the battery pack and through the inverter.

In additional embodiments, the tow assist unit includes an inertial measurement unit and a controller that receives inputs from the inertial measurement unit. The controller is configured to apply differential braking through the brake and differential traction through the drive unit to effect stability changes of the system.

In a number of other embodiments, a tow assist system for towing a trailer by a lead vehicle includes a tow assist unit that has four wheels arranged on two axles. The tow assist unit configured to couple between the lead vehicle and the trailer. A sensor senses forces between the lead vehicle and the tow assist unit. Another sensor senses forces between the trailer and the lead vehicle including a towing force required to tow the trailer. An inertial measurement unit senses translation and rotation of the tow assist unit. In response to the first and second forces, a pair of drive units onboard the tow assist unit at one of the axles drive two of the wheels to bear at least a portion of the towing force by the tow assist unit. In response to the first and second forces, a pair of brakes on the tow assist unit operate to slow the trailer. In response to the translation and rotation, the pair of drive units differentially drive the tow assist unit. In response to the translation and rotation, the pair of brakes differentially brake the tow assist unit.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application or its uses. Furthermore, there is no intention to be bound by any expressed or implied theory presented in the preceding technical field, introduction, brief summary or the following detailed description.

Figure 1:
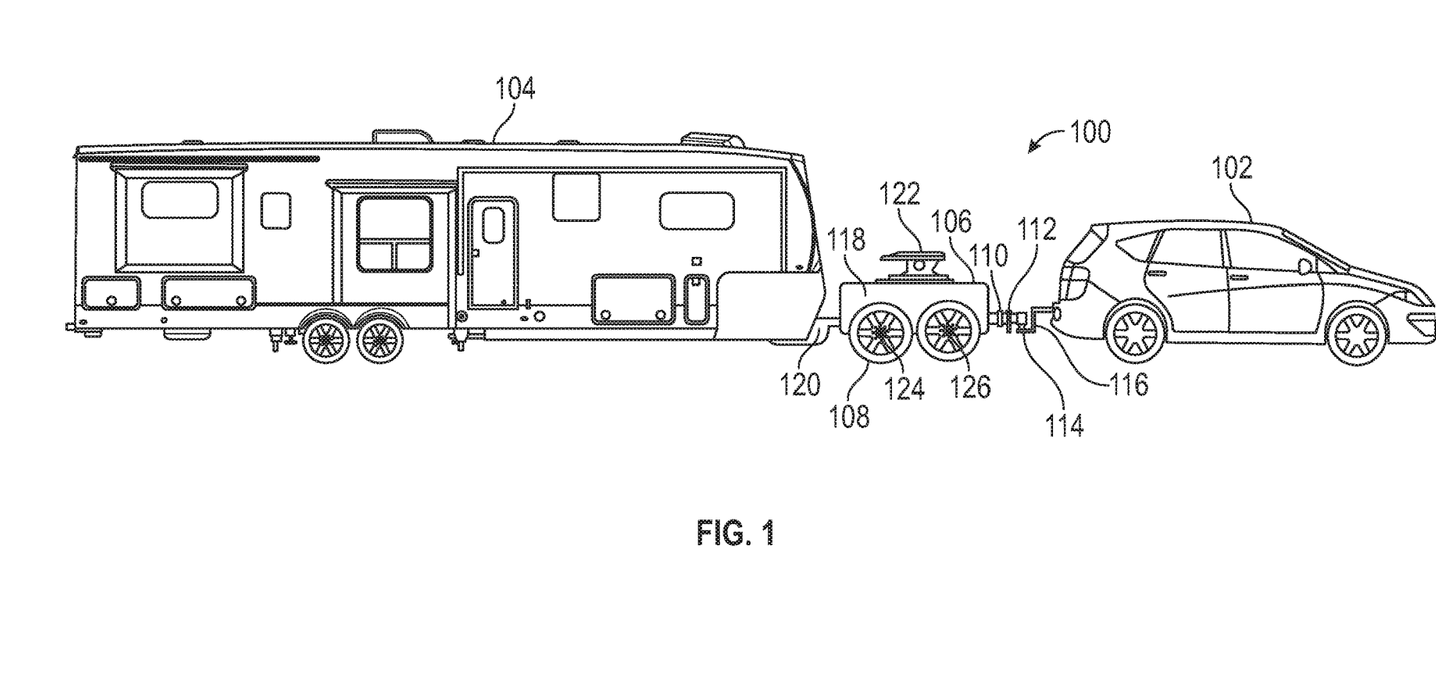
FIG. 1 illustrates a tow assist system, in accordance with various embodiments.

FIG. 1 illustrates a tow assist system 100 that generally includes a lead vehicle 102, a trailer 104 and a tow assist unit 106 coupled between the lead vehicle 102 and the trailer 104. In the context of this disclosure, the term trailer means a load generally, that trails behind and is towed by the lead vehicle 102, whether on wheels or other supports. The lead vehicle 102 is configured to operate with or without being connected with the trailer 104. The tow assist unit 106 may be operated in a number of applications connected with both the lead vehicle 102 and the trailer 104, with one of the lead vehicle 102 or the trailer 104, or independently on its own. In this embodiment, the lead vehicle 102 is configured as a mid-sized SUV, for example, with a class 3 type maximum towing capacity of approximately 2300 kilograms (8000 pounds) and the trailer 104 may be configured as a travel trailer with a GVW of approximately class 4 or 5 type such as up to approximately 4500 kilograms (10,000 pounds) to 5400 kilograms (12,000 pounds). In other embodiments, the lead vehicle 102 may have a towing capacity in a different class, for example class 1 or class 2, or even class 4. Notable, is that the weight of the trailer 104 exceeds the towing capacity of the lead vehicle 102. Towing the trailer 104 is enabled by operation of the tow assist unit 106.

Figure 7:
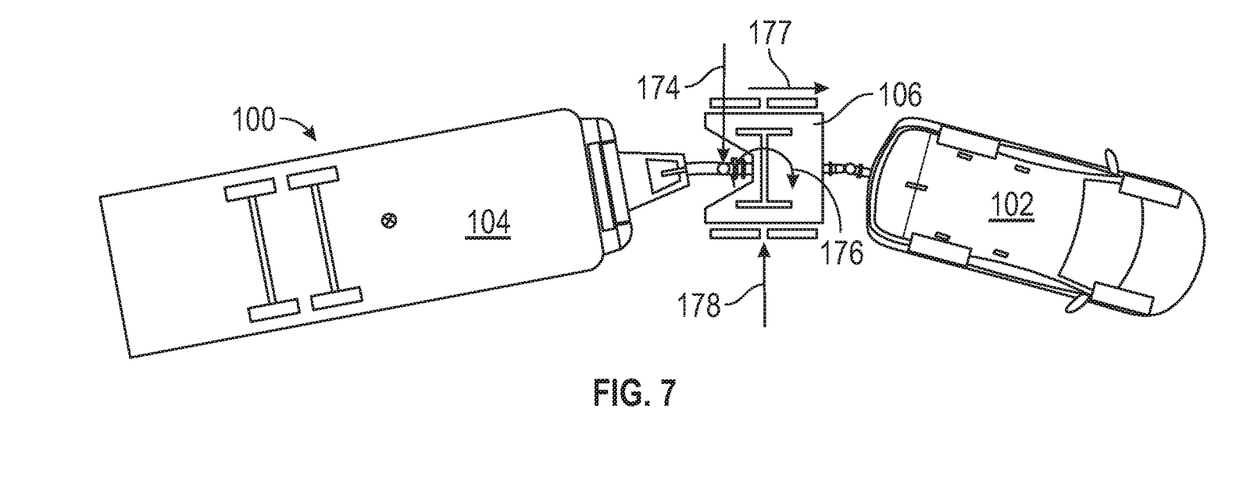
FIG. 7 is a schematic illustration of maneuverability enhancement by the tow assist system of FIG. 1, in accordance with various embodiments.

In general, the tow assist unit 106 includes four wheels 108, a tongue 110 with a coupler 112 configured to couple with a ball 114 on a hitch 116 of the lead vehicle 102, and a hitch 118 configured to couple with a coupler 120 of the trailer 104. In this embodiment, the tow assist unit 106 also includes a fifth wheel type coupling 122 for coupling with a fifth wheel type trailer (FIG. 7). The wheels 108 are arranged on a pair of axles 124, 126 in this embodiment. In other embodiments, the tow assist unit 106 may have a different number of axles. The tow assist unit 106 does not include an operator seat or other riding position. In addition, the tow assist unit 106 is configured to operate in a normal mode between a conventional lead vehicle 102 and a conventional trailer 104 while traveling over public roadways.

As will be appreciated, the lead vehicle 102 has a tongue weight capacity in addition to a towing capacity. The trailer 104 may have a tongue weight that exceeds the tongue weight capacity of the lead vehicle 102. The tongue weight of the trailer 104 is borne by the tow assist unit 106, which enables carrying tongue weights up to the axle capacity of the axles 124, 126 minus the weight of the tow assist unit 106. The weight/load is distributed on the axles 124, 126, which are in relatively close proximity to each other due to the compact length of the tow assist unit 106. In addition, the connection point of the hitch 118 may be near or directly over the axle 124 to reduce or eliminate cantilevering typically found in bumper-pull type setups.

Figure 2:
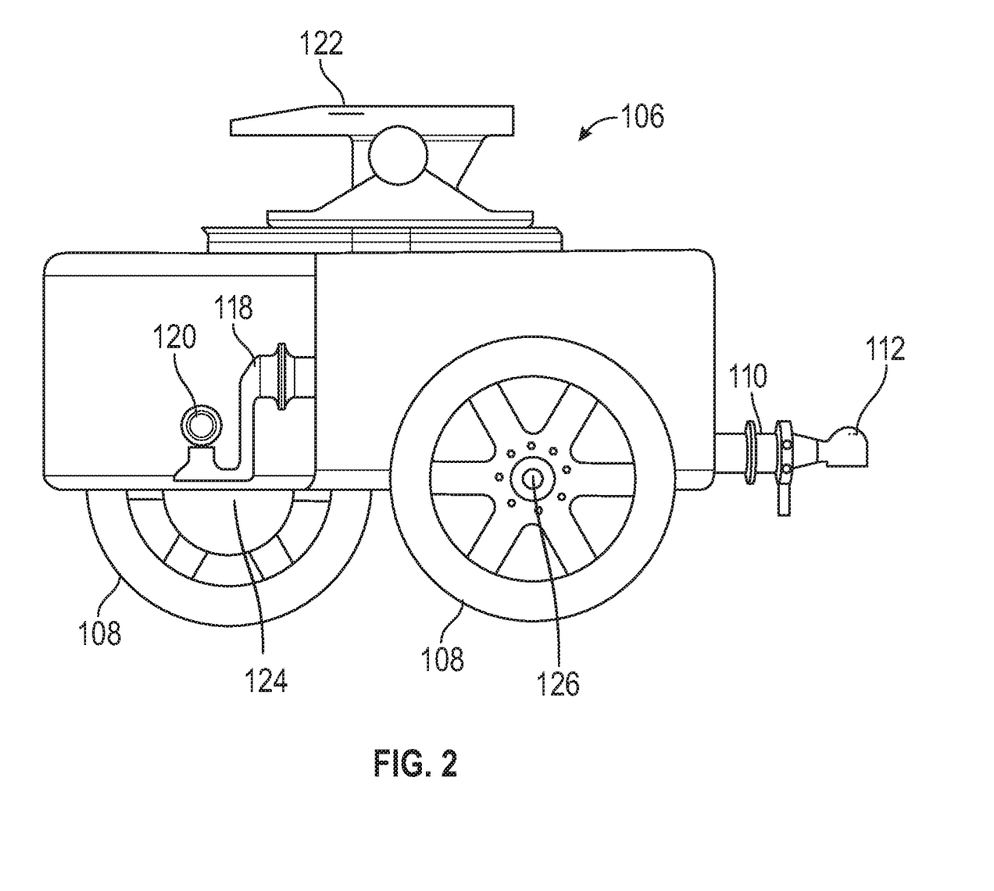
FIG. 2 illustrates a tow assist unit, in accordance with various embodiments.

Referring to FIG. 2, the tow assist unit 104 is illustrated schematically. As shown, the hitch 118 includes a ball 130 for coupling with the trailer 104. The ball 130 is located inboard from the rear end 132 of the tow assist unit 104, and may be placed directly over the axle 124 to assist with dynamics and traction. Weight distribution to the two axles 124, 126 is approximately even in the case of a fifth wheel trailer due to the centered position of the fifth wheel coupling 122 relative to the axles 124, 126. This distribution is advantageous due to the relatively heavier tongue weight accompanying such fifth wheel trailers. In other embodiments, the fifth wheel coupler 122 may be located directly above one of the axles 124, 126 delivering dynamics similar to those in a convention truck setup. Due to the intervening tow assist unit 106, the tongue weight of the trailer 104 is not transferred to the lead vehicle 102. Instead, the lead vehicle 102 only experiences the tongue weight applied by the tow assist unit 106, which may be at or near zero or a minimal amount desired for a secure connection.

Figure 3:
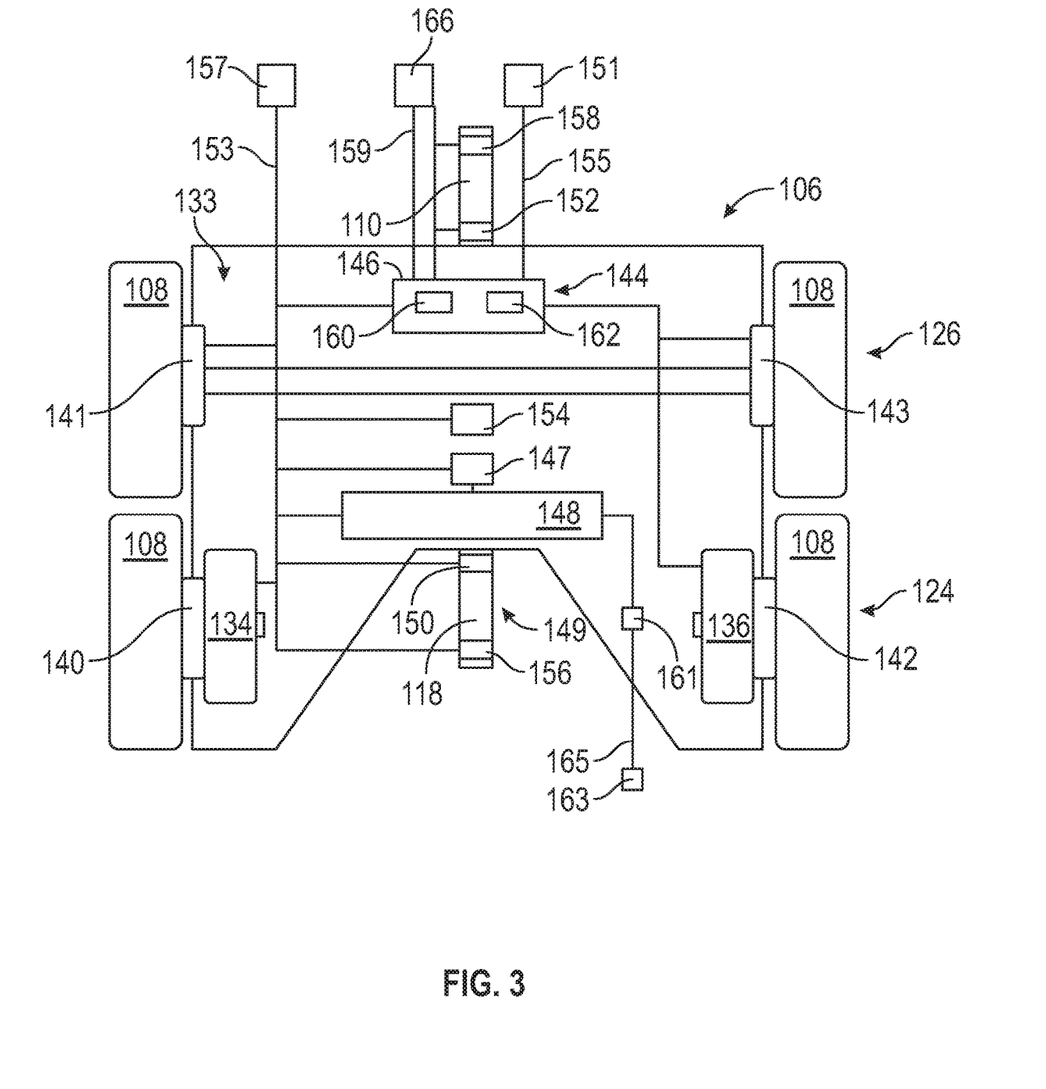
FIG. 3 is a schematic illustration of the tow assist system of FIG. 1, in accordance with various embodiments.

As shown in FIG. 3, the tow assist unit 106 includes an actuator system 133 that may include two electric drive units 134, 136 one independently driving each of the wheels 108 on the axle 124. The drive units 134, 136 may include electric drive motors and power controllers. In this embodiment, because the axle 124 carries much of the tongue weight load of the trailer 104, driving the wheels 108 on the axle 124 advantageously provides maximum traction. In other embodiments, the wheels 108 on the axle 126 may be driven, or all four wheels 108 may be driven. Because each drive unit 134, 136 is independently drivable, a differential drive type traction steerability may be provided such as to maintain inline tracking and to counteract any susceptibility to sway. In addition, the actuator system 133 may include brakes 140, 142 on the wheels 108 of the axle 124, which may be used for braking, charging and for stability control. For example, during deceleration of the lead vehicle 102, the brakes 140, 142 are activated to slow the trailer 104. In another example, in response to a reversal of the towing force of the trailer 104 where the trailer exerts a force on the tow assist unit 106, the brakes 140, 142 are actuated to slow the tow assist system 100. Brakes 141, 143 may also be provided for the wheels 108 of axle 126.

The tow assist unit 104 also includes a control system 144 that generally includes a controller 146, power electronics 147, a battery pack 148 and a sensor system 149. The sensor system 149 includes one or more sensing devices that sense observable conditions of the tow assist unit 106. In this embodiment, the sensing devices include, but are not limited to, load sensors 150, 152, an inertial measurement unit 154 and position/angle sensors 156, 158. The load sensors 150, 152 may be multi-axis load sensors where the load sensor 150 detects loads on the tow assist unit 106 from the trailer 104 and the load sensor 152 detects loads on the tow assist unit 106 from the lead vehicle 102. For example, lateral and longitudinal forces may be measured by the load sensors 150, 152. In addition, hitch articulation angles may be sensed by the position sensors 156, 158, which may be rotary position sensors or another type. The inertial measurement unit 154 may include accelerometers and gyroscopes, which may be in electronic form to provide motion, position, and navigational sensing over a number of degrees of freedom. For example, microelectromechanical system (MEMS) devices may be used to sense translation such as surge, heave, sway and rotation such as roll, pitch and yaw. In a number of embodiments, a coupling 155 may be provided between the tow assist unit 106 and the power system 151 of the lead vehicle 102 for cross charging and power supply sharing. In addition, a charging cable 153 is provided for charging the battery pack 148 from an off-board source 157 such as the electric grid or another source. Typical connections (not shown), with the lead vehicle 102 for indicator light operation and brake operation will be included passing through the tow assist unit 1-6 to the trailer 104. The tow assist unit 106 may use indicator light initiation and brake initiation to initiate control actions of the actuators 133 during operation.

The controller 146 includes at least one processor 160 and a computer readable storage device or media 162. The processor 160 may be any custom made or commercially available processor, a central processing unit (CPU), a graphics processing unit (GPU), an auxiliary processor among several processors associated with the controller 146, a semiconductor based microprocessor (in the form of a microchip or chip set), a macroprocessor, any combination thereof, or generally any device for executing instructions. The computer readable storage device or media 162 may include volatile and nonvolatile storage in read-only memory (ROM), random-access memory (RAM), and keep-alive memory (KAM), for example. KAM is a persistent or non-volatile memory that may be used to store various operating variables while the processor 160 is powered down. The computer-readable storage device or media 162 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 146 in controlling the tow assist unit 106.

The instructions may include one or more separate programs, each of which comprises an ordered listing of executable instructions for implementing logical functions. The instructions, when executed by the processor 160, receive and process signals from the sensor system 149, perform logic, calculations, methods and/or algorithms for controlling the components of the tow assist unit 106 through the actuator system 133. Although only one controller 146 is shown in FIG. 3, embodiments of the tow assist unit 106 may include any number of controllers that communicate over any suitable communication medium or a combination of communication mediums and that cooperate to process the sensor signals, perform logic, calculations, methods, and/or algorithms, and generate control signals to automatically control features of the tow assist unit 106. In addition, in some embodiments, the controller 146 may have a coupling 159 with the controller area network (CAN) 166 of the lead vehicle 102 and therethrough with its various controllers.

Figure 4:
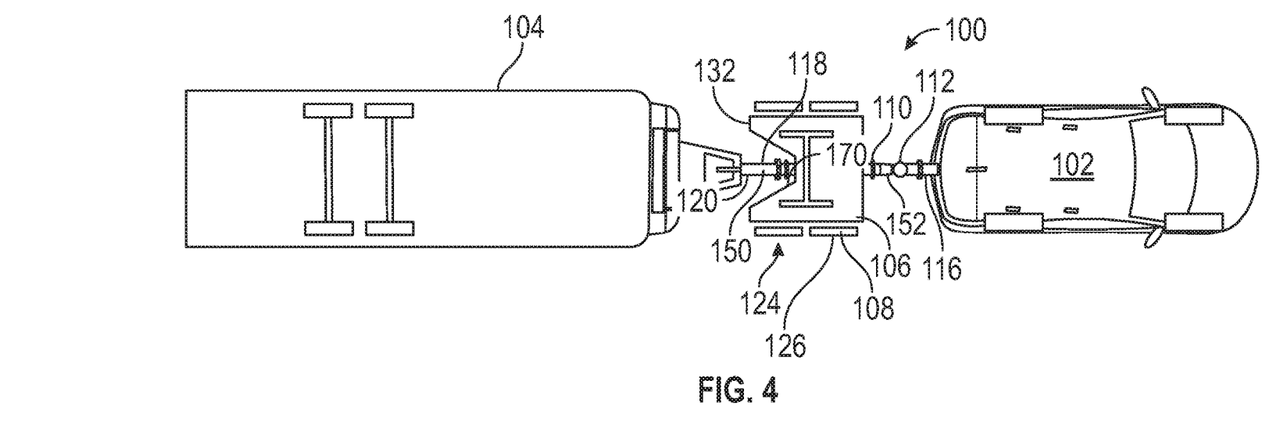
FIG. 4 is a schematic illustration of the tow assist system of FIG. 1, in accordance with various embodiments.

As shown in FIG. 4, The tow assist unit 106 is configured to couple between the lead vehicle 102 and the trailer 104 with only a modest amount of added length. The tow assist unit 106 includes a recess 170 in its rear end 132 so that the hitch 118 and the coupling point with the trailer 104 is disposed over or close to the axle 124. The load sensor 152 is disposed in the tongue 110 of the tow assist unit 106. In other embodiments, the load sensor 152 may be disposed in the coupler 112. The load sensor 150 is disposed in the hitch 118. Accordingly, the lead vehicle 102 and the trailer 104 may connect with the tow assist unit 106 without modifications when matching couplers and balls are used. However, in some embodiments, coupling with the control system of the lead vehicle 102, such as through the coupling 159 that provides additional opportunities to control the tow assist system 106.

Figure 5:
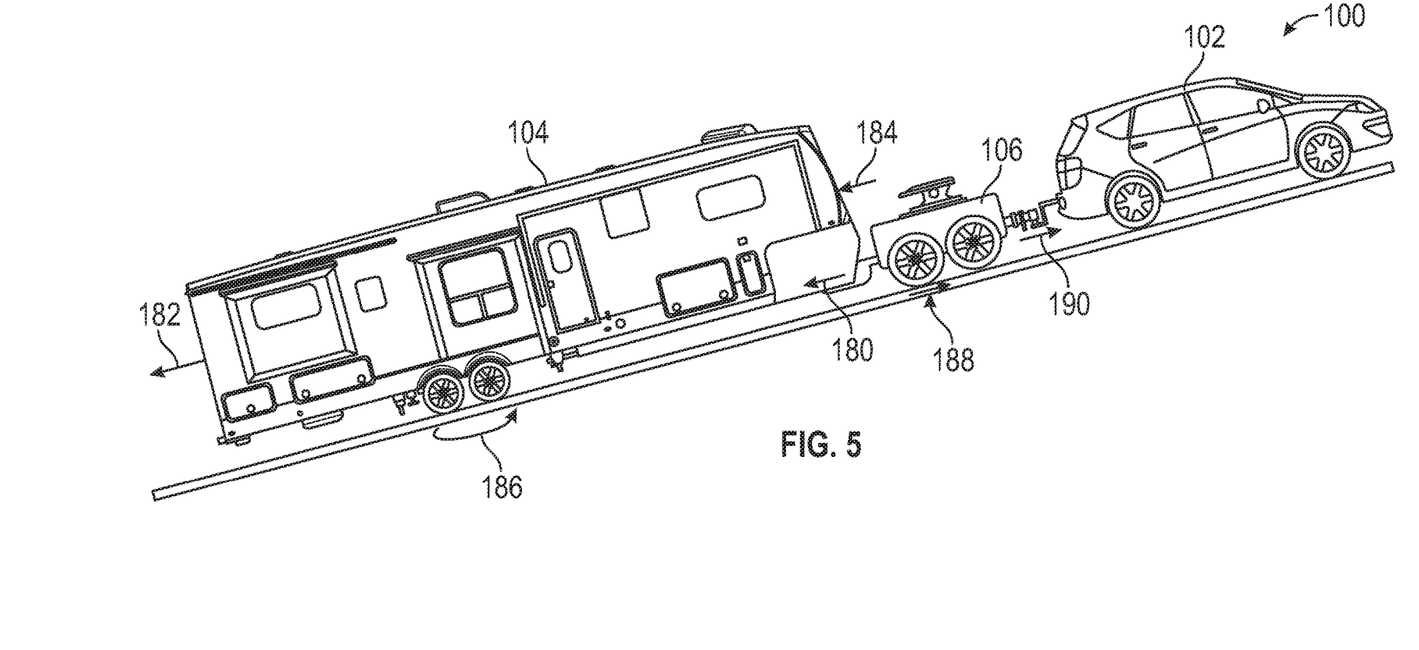
FIG. 5 is a schematic illustration of towing force management by the tow assist system of FIG. 1, in accordance with various embodiments.

In operation, the control system 144 uses inputs from the sensor system 149 to control the actuators 133 to enable towing of the trailer 104 with the lead vehicle 102. For example, as shown in FIG. 5, the towing force 180 of the trailer 104 is a combination of the gradient resistance 182, aerodynamic resistance 184 and rolling resistance 186. The towing force 180 is the force that must be offset to tow the trailer 104. It will be appreciated that the towing force 180 may reverse where the trailer 104 pushes on the tow assist unit 106 such as during a downhill descent. In this case, the tow assist unit 106 may be provided with data on the towing capacity of the lead vehicle 102 and the controller 146 may be programmed to provide a tow assist force 188 so that towing capacity of the lead vehicle 102 is not exceeded. In some embodiments, a maximum percentage of the towing capacity of the lead vehicle 102 may be selected so that for example, the tow assist force 188 is delivered without exceeding that selected percentage of the towing capacity of the lead vehicle 102. With the tow assist unit 106 delivering the tow assist force 188, the lead vehicle 102 provides a reduced towing force 190 that is the difference between the trailer towing force 180 and the tow assist force 188. The tow assist unit 106, as controlled by the processor 160 of the controller 146, ensures the lead vehicle's towing capacity is not exceeded. To do so, the processor 160 monitors the load sensor 152 to determine the force exerted by the lead vehicle 102.

Figure 6:
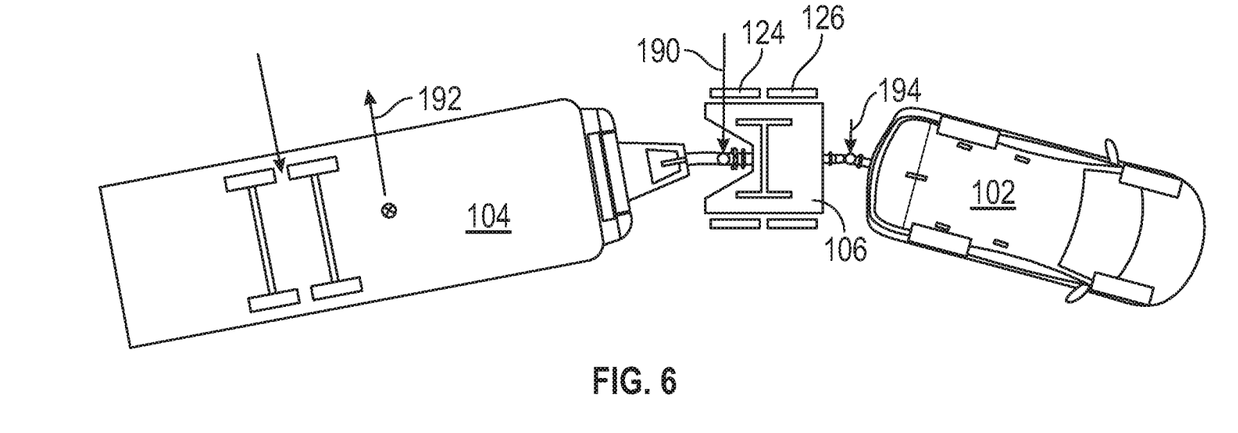
FIG. 6 is a schematic illustration of stability enhancement by the tow assist system of FIG. 1, in accordance with various embodiments.

With reference to FIG. 6, the tow assist system 100 delivers improved handling and stability as compared to a setup without the tow assist unit 106. For example, the tow assist unit 106 exhibits a strong lateral stiffness due to the inclusion of two axles 124, 126 with four wheels 108. The stiffness results in a lateral force 190 from the tow assist unit 106 to the trailer 104 that compensates for the cornering force 192 of the trailer 104. As a result of the offset, a near-zero lateral force 192 from the tow assist unit 106 to the lead vehicle 102 results. In addition to the stiffness benefits of the tow assist unit 106, the drive units 134, 136 and the brakes 140, 142 are actuated by the controller 146 to actively control the lateral forces to effect trajectory changes of the tow assist system 100 for improved dynamics and stability. Inputs from the sensor system 149 are used to control the actuators 133 for example, to negate sway and improve cornering dynamics/stability (e.g. through differential traction and/or differential braking). For example, when navigating through a right turn as illustrated, inputs from the inertial measurement unit 154 and the load sensors 150, 152 may indicate to the processor 160 that a need exists to offset force from the trailer 104 onto the hitch 118. Accordingly, the actuators 133 may be activated to counter the applied force, such as by creating traction steering through differential driving of the drive units 134, 136 and/or by differential braking of the brakes 140, 142.

As shown in FIG. 7, inclusion of the tow assist unit 106 improves maneuverability of the trailer 104 and the lead vehicle 102. Inputs from the sensor system 149 to the controller 146 are used to control the actuators 133 for example, to control tracking such as through traction steering. For example, when the tow assist system 100 maneuvers through a right turn as shown, indication is delivered to the controller 146 by the forces 172 placed on the tongue 110 as sensed by the load sensor 152 and forces 174 on the hitch 118 as sensed by the load sensor 150, angles from the position sensors 156, 158 concerning the angles involved, and moments 176 from the inertial measurement unit 154. In this situation, those inputs are used to determine the optimal intervention such as by the drive unit 134, 136, which may be activated and/or by the brake 140, 142, which may be actuated for a differential traction 177 resulting in a correction force 178 to improve tracking of the trailer 104. In embodiments with a connection between the tow assist unit 106 and the CAN bus 166 of the lead vehicle 102, steering inputs of the lead vehicle 102 may be used to anticipate trailer tracking and control the actuators 133 to track the tow assist unit 106 and the trailer 104 wider around the inside of the turn.

Figure 8:
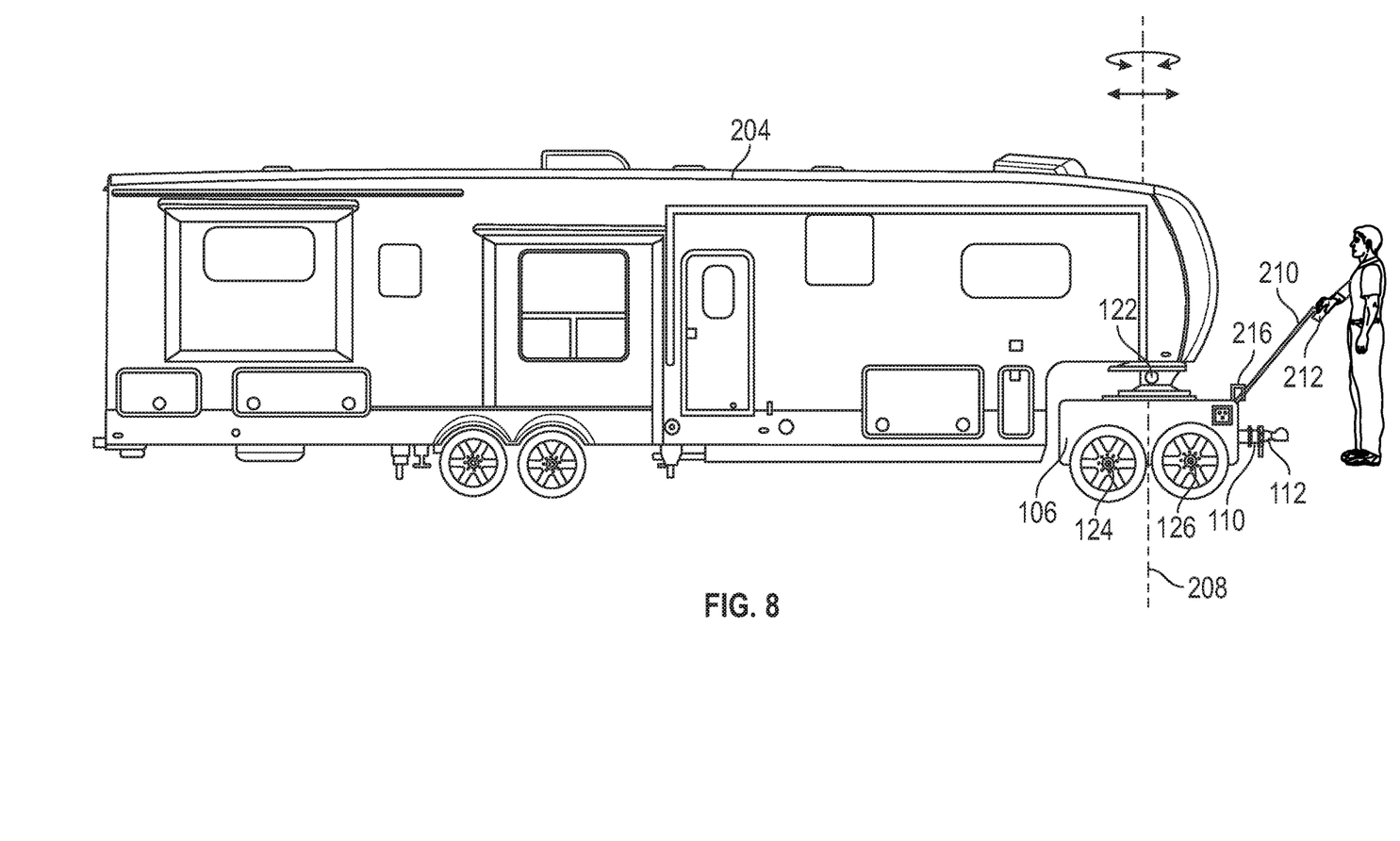
FIG. 8 is a schematic illustration of manual maneuvering by the tow assist system of FIG. 1, in accordance with various embodiments.

In a number of embodiments as illustrated in FIG. 8, the tow assist unit 106 may be used in a manual mode. In this example, the tow assist unit 106 is coupled with a fifth wheel type trailer 204 by the fifth wheel coupling 122. This places the connection 206 with the trailer 204 over the center 208 of the tow assist unit 106 between the axles 124, 126, which provides optimal maneuverability. Notable is that in a fifth wheel trailer 204 mode, the lead vehicle 102 will couple with the tow assist unit 106 through the bumper-pull type coupler 112. An interface 210 is provided between the user and the tow assist unit 106. In this embodiment, the interface is a handle connected to the tow assist unit 106, which may include a switch 212 that must be depressed to operate the tow assist unit 106 in manual mode. A position/angle sensor 216 may be positioned at the connection of the interface 210 with the tow assist unit 106. Movement of the interface 210 by the user initiates a response to drive the actuators 133 and maneuver the trailer 204. In some embodiments, the tow assist unit 106 operates in autonomous mode. For example, the tow assist unit 106 may automatically locate and couple with the trailer 204. Subsequently, the tow assist unit 106 may autonomously move the trailer 204 and couple with the lead vehicle 102.

In additional embodiments, a connection 155 (FIG. 2) between the power system of the tow assist unit 106 and a power system 151 of the lead vehicle 102 may be included. The lead vehicle 102 may be used to charge the battery pack 148 of the tow assist unit 106. In addition, the tow assist unit 106 may be used to charge a battery pack of the lead vehicle 102, for example when the lead vehicle 102 is an electric vehicle. In some embodiments, the battery pack 148 may be coupled with an inverter 161 to output AC power through the tow assist unit 106 to the trailer 104 or other 120/240V load 163, such as while parked. To deliver power a coupling 165 may be provided between the tow assist unit 106 and the trailer 104 to handle the power supply requirements would be included.

Accordingly, a tow assist system 100 enables towing a large trailer 104, such as a class 5 trailer by a smaller lead vehicle 102, such as a class 3 vehicle. In addition to use for conventional towing, the tow assist unit 106 may be used to manually or autonomously relocate trailers. The tow assist unit 106 may also be used for specialty applications, such as launching large vessels on a steep ramp or to assist in towing heavy loads up steep inclines. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A tow assist system for towing a trailer by a lead vehicle, the system comprising:
   a tow assist unit including at least two wheels and the tow assist unit including actuators, the tow assist unit configured to:
      couple between the lead vehicle and the trailer, wherein the lead vehicle has a maximum towing capacity; and
      drive, by a drive unit onboard the tow assist unit, at least one of the at least two wheels,
   wherein the tow assist unit includes a first load sensor configured to sense first forces, where the first forces are between the tow assist unit and the lead vehicle,
   wherein the tow assist unit includes a second load sensor configured to sense second forces, where the second forces are between the trailer and the tow assist unit,
   wherein a towing force magnitude is an amount of force required to tow the trailer,
   wherein the tow assist unit includes a controller configured to:
      receive the maximum towing capacity of the lead vehicle;
      determine, by monitoring the first load sensor, a tow force exerted by the lead vehicle;
      determine, by monitoring the first and second load sensors, the towing force magnitude; and
      operate the actuators to drive the tow assist unit to deliver a tow assist force that, along with the tow force, supplies the towing force magnitude, while maintaining the tow force below a maximum threshold amount that is equal to the maximum towing capacity of the lead vehicle.

2. The system of claim 1, wherein:
the lead vehicle is configured to operate at a maximum towing capacity, and
the maximum threshold amount is approximately equal to the maximum towing capacity.

3. The system of claim 1, wherein:
the lead vehicle is configured to operate at a maximum towing capacity, and
the maximum threshold amount is equal to a selected percentage of the maximum towing capacity.

4. The system of claim 1, comprising a coupling between the lead vehicle and the tow assist unit through which a charging power supply is delivered.

5. The system of claim 1, wherein the tow assist unit is configured to operate in a manual mode separate from the lead vehicle, and comprising a handle connected to the tow assist unit at a connection, and a position sensor disposed at the connection of the handle with the tow assist unit, wherein the controller is configured to operate the actuators to maneuver the trailer via the tow assist unit in response to movement of the handle as sensed by the position sensor.

6. The system of claim 1, comprising an inertial measurement unit and a controller each on the tow assist unit, the controller configured to actuate the drive unit in response to inputs from the inertial measurement unit to effect trajectory changes in the system for stability.

7. The system of claim 1, comprising a fifth wheel coupling between the tow assist unit and the trailer and a bumper-pull type coupling between the lead vehicle and the tow assist unit.

8. The system of claim 1, wherein the tow assist unit is configured to supply electrical power to the trailer.

9. The system of claim 1, wherein the tow assist unit includes an axle on which the at least two wheels rotate and a recess in a rear end of the tow assist unit, and comprising a hitch disposed in the recess and configured to couple with the trailer, with a ball on the hitch that is substantially centered over the axle.

10. The system of claim 1, comprising:
a tongue on the tow assist unit configured to couple with the lead vehicle; and
a hitch on the tow assist unit configured to couple with the trailer;
wherein the controller is configured to actuate the drive unit and the actuators in response to inputs from the first and second load sensors so that the lead vehicle bears only a portion of the force between the trailer and the tow assist unit.

11. A tow assist system for towing a trailer by a lead vehicle, the system comprising:
a tow assist unit including four wheels arranged on two axles and including actuators, the tow assist unit configured to:
couple between the lead vehicle and the trailer, wherein the lead vehicle has a maximum towing capacity;
drive, by a drive unit onboard the tow assist unit, at least one of the wheels; and
brake, by a brake on the tow assist unit and in response to the towing force, to slow the trailer,
wherein the tow assist unit includes a first load sensor configured to sense first forces, where the first forces are between the tow assist unit and the lead vehicle,
wherein the tow assist unit includes a second load sensor configured to sense second forces, where the second forces are between the trailer and the tow assist unit,
wherein a towing force magnitude is an amount of force required to tow the trailer,
wherein the tow assist unit includes a controller configured to:
receive the maximum towing capacity of the lead vehicle;
determine, by monitoring the first load sensor, a tow force exerted by the lead vehicle;
determine, by monitoring the first and second load sensors, the towing force magnitude; and
operate the actuators to drive the tow assist unit to deliver a tow assist force that, along with the tow force, supplies the towing force magnitude, while maintaining the tow force below a maximum threshold amount that is equal to the maximum towing capacity of the lead vehicle.

12. The system of claim 11, wherein;
the lead vehicle is configured to operate at a maximum towing capacity, and
the maximum threshold amount is approximately equal to the maximum towing capacity.

13. The system of claim 11, wherein:
the lead vehicle is configured to operate at a maximum towing capacity, and
the maximum threshold amount is equal to a selected percentage of the maximum towing capacity.

14. The system of claim 11, comprising a coupling between the lead vehicle and the tow assist unit through which a charging power supply is delivered.

15. The system of claim 11, wherein the tow assist unit is configured to operate in a manual mode separate from the lead vehicle, and comprising a handle connected to the tow assist unit at a connection, and a position sensor disposed at the connection of the handle with the tow assist unit, wherein the controller is configured to operate the actuators to maneuver the trailer via the tow assist unit in response to movement of the handle as sensed by the position sensor.

16. The system of claim 11, comprising an inertial measurement unit and a controller each on the tow assist unit, the controller configured to actuate the drive unit and the brake in response to inputs from the inertial measurement unit to effect trajectory changes in the system for stability.

17. The system of claim 11, comprising a fifth wheel coupling between the tow assist unit and the trailer, and a bumper-pull type coupling between the lead vehicle and the tow assist unit.

18. The system of claim 11, comprising a battery pack and an inverter on the tow assist unit, wherein the tow assist unit is configured to supply power to the trailer from the battery pack and through the inverter.

19. The system of claim 11, wherein the tow assist unit includes an inertial measurement unit and a controller receiving inputs from the inertial measurement unit, wherein the controller is configured to apply differential braking through the brake and differential traction through the drive unit to effect stability changes of the system.

20. A tow assist system for towing a trailer by a lead vehicle, the system comprising:
a tow assist unit including four wheels arranged on two axles and including actuators, the tow assist unit configured to:
couple between the lead vehicle and the trailer, wherein the lead vehicle has a maximum towing capacity;

sense, by a first sensor, first forces between the lead vehicle and the tow assist unit;
sense, by a second sensor, second forces between the trailer and the lead vehicle including a towing force required to tow the trailer;
sense, by an inertial measurement unit, translation and rotation of the tow assist unit;
drive, by a pair of drive units onboard the tow assist unit at one of the axles and in response to the first and second forces, two of the wheels to bear at least a portion of the towing force by the tow assist unit;
brake, by a pair of brakes on the tow assist unit and in response to the first and second forces, to slow the trailer;
differentially drive, by the pair of drive units and in response to the translation and rotation, the tow assist unit; and
differentially brake, by the pair of brakes and in response to the translation and rotation, the tow assist unit,
wherein a towing force magnitude is an amount of force required to tow the trailer,
wherein the tow assist unit includes a controller configured to:
receive the maximum towing capacity of the lead vehicle;
determine, by monitoring the first sensor, a tow force exerted by the lead vehicle;
determine, by monitoring the first and second sensors, the towing force magnitude; and
operate the actuators to drive the tow assist unit to deliver a tow assist force that, along with the tow force, supplies the towing force magnitude, while maintaining the tow force below a maximum threshold amount that is equal to the maximum towing capacity of the lead vehicle.

\* \* \* \* \*